July 19, 1927.
E. HOGE ET AL
1,635,998
TOOL
Filed Feb. 15, 1926
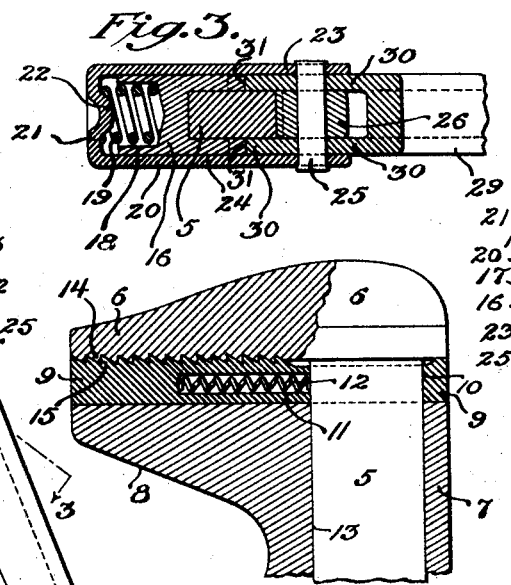
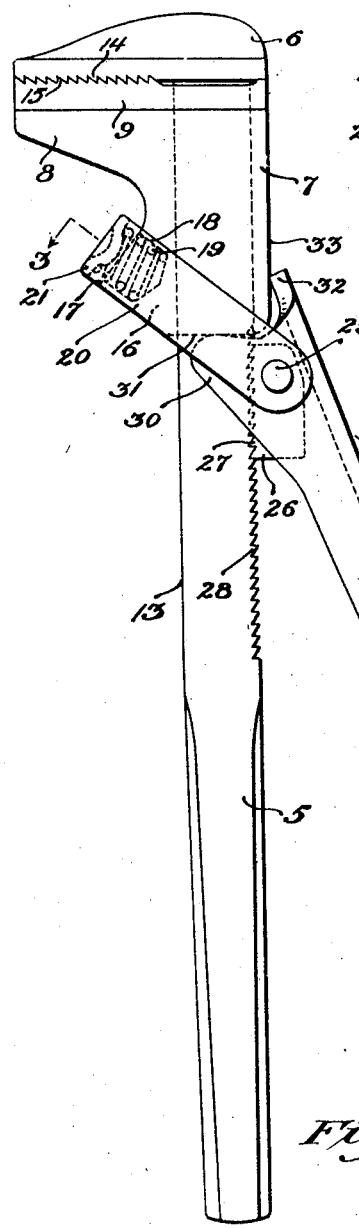
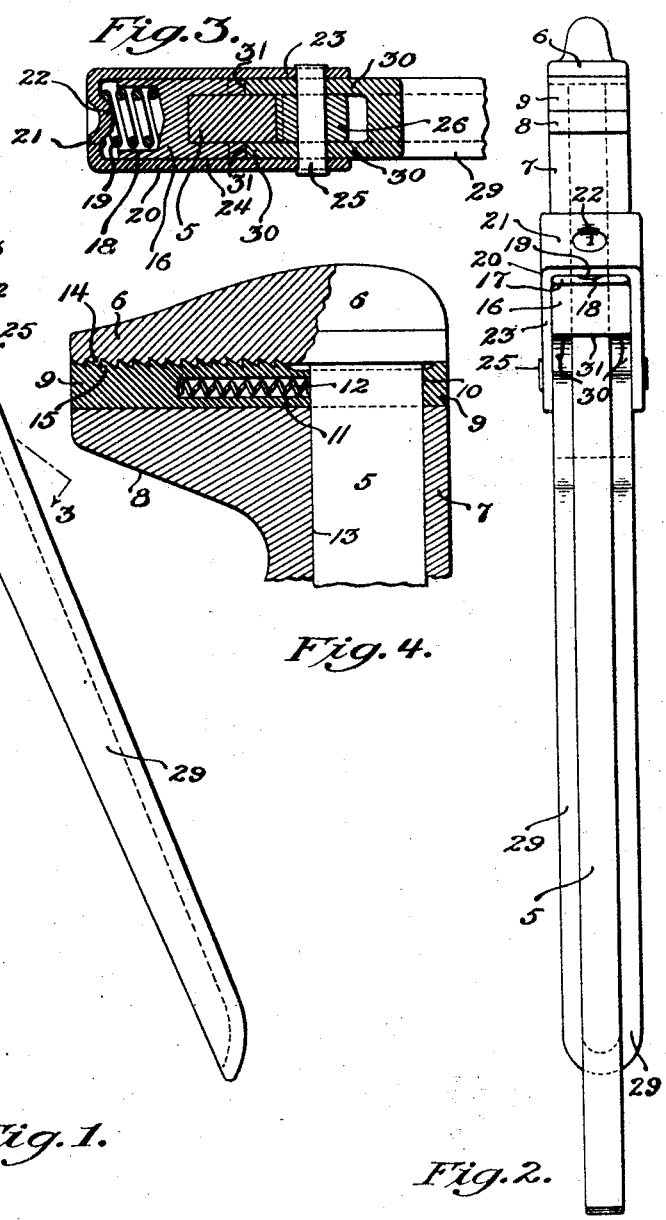
Witnesses,
Rae Newmark
Arthur B. Fraser
Inventors,
Edward Hoge
Friedrich K. Hoge
by Augustus B. Coppes
their Attorney.

Patented July 19, 1927.

1,635,998

UNITED STATES PATENT OFFICE.

EDWARD HOGE AND FRIEDRICH KARL HOGE, OF PHILADELPHIA, PENNSYLVANIA.

TOOL.

Application filed February 15, 1926. Serial No. 88,274.

One object of our invention is to provide an improved tool which can be readily and advantageously used by hand for tightly grasping and for turning or holding articles of various shapes.

Another object is to so construct our improved tool that it will be strong and durable and will possess a powerful mechanical advantage.

These objects and other advantageous ends which will be set forth hereinafter, we attain in the following manner, reference being had to the accompanying drawing in which Figure 1 is a side elevation showing our improved tool, Figure 2 is a front elevation of the tool shown in Figure 1, Figure 3 is a fragmentary sectional view taken on the line 3—3 of Figure 1, and Figure 4 is a fragmentary elevation, partly in vertical section, showing certain of the features of our invention and illustrated on a slightly enlarged scale from that shown in said other figures of drawing.

Referring to the drawing, 5 represents a stem or shank having a head jaw 6 at one end. The head jaw 6 may be formed integral with the shank 5 or may be secured thereto in any suitable manner. A jaw carriage 7 is slidably mounted on the shank 5 and has a jaw 8 projecting therefrom. An intermediate jaw 9, as clearly shown in Figure 4, has a hole 10 through which the shank 5 passes so that said jaw 9 can slide upwardly and downwardly on said shank when the jaw carriage 7 is moved to a lower position than that illustrated in Figures 1 and 4. The jaw 9 has a bore or cavity 11 which communicates with the hole 10 and within this cavity is positioned a coiled spring 12, said spring being under pressure and frictionally engaging the front edge surface 13 of the shank 5. The lower surface of the head jaw 6 has a row of downwardly projecting teeth 14 while the upper surface of the intermediate jaw 9 has a row of teeth 15, the teeth 14 and 15 being preferably so spaced as to intermesh when the intermediate jaw 9 is in its raised position as shown in Figures 1 and 4.

The jaw carriage 7 has a projection 16 which terminates at one end in a slanting shoulder surface 17. A bore or cavity 18 extends inwardly from said surface 17 and forms a downwardly slanting housing for a portion of the length of a coiled spring 19. A yoke 20 has a transversely closed end portion 21 with an inwardly projecting boss 22, said boss 22 projects part way into the space between the outer end coils of the spring 19 as clearly shown in Figures 1 and 3, said end portion 21 preferably normally extending parallel with the shoulder 17. The yoke 20 has leg portions 23 and 24 which embrace the opposite side surfaces of the jaw carriage 7 and carry a pivot pin 25. Said pivot pin extends through a fulcrum block 26 at the rear of the shank 5. The forward surface of the fulcrum block 26 has a row of teeth 27 adapted to intermesh with a longer row or rack of teeth 28 on the rear surface of the shank 5. The pressure of the spring 19 against the end portion 21 of the yoke 20 causes the fulcrum block 26 to be normally held in mesh with the teeth 28 of the shank 5, it being noted that under such conditions the spring 19 can be further compressed, which compression takes place during the adjustment of the tool in a manner hereinafter described.

A hand lever 29 which is preferably made channel shape embraces the fulcrum block 26 and is pivotally mounted on the pin 25 at a position within the confines of the legs 23 and 24 of the yoke 20. The lever 29 has extensions 30 which embrace the side surfaces of the shank 5 within the confines of the legs 23 and 24 of the yoke 20 and said extensions 30 serve as cams for contact with the bottom edge 31 of the jaw carriage 7 at positions at opposite sides of the shank 5 and within the confines of the legs 23 and 24 as clearly shown in Figure 1. The upper end 32 of the lever 29 at a position above the cam extensions 30 is adapted, when the hand lever 29 is swung rearwardly from the position shown in Figure 1, to press against the rear surface 33 of the jaw carriage 7 as a fulcrum, said action tending to move the fulcrum block 26 rearwardly and withdraw its teeth 27 out of mesh with the rack teeth 28 of the shank 5, the spring 19 being compressed by said action to allow said movement of the block. After the lever 29 is moved as just described the jaw carriage 7 can be freely slid on the shank 5. When the lever 29 is released the spring 19 will again expand and move the yoke 20 forwardly and with it the block 26 into mesh with the teeth 28. In this manner the jaw 8 can be moved and held in any spaced position relatively to the jaws 6 and 9.

Considering that the carriage 7 has been moved downwardly from the position shown in Figure 1 and that the teeth 27 of the block 26 have been allowed to again mesh with the teeth 28 of the shank 5, if the lever 29 is swung toward the shank 5 the cam extensions 30 will engage the bottom edge 31 of the jaw carriage 7 and the pin 25 will serve as a fulcrum for the lever 29. This action will cause the cam extensions 30 to move the jaw carriage 7 toward the jaws 6 and 9 and the tool can be used in this capacity as a monkey wrench or as pincers or pliers.

If the tool is to be used as a pipe wrench or for grasping, holding or turning a round or irregular article, the intermediate jaw 9, after the carriage has been lowered, can be slid downwardly on the shank 5 against the friction exerted by the spring 12 and then by moving the lever 29 toward the shank 5 the article will be grasped between the teeth of the jaws 6 and 9.

It will be noted that the shank 5 and lever 29 can be grasped between the palm of the hand and the fingers so that great power can be applied, which power is greatly amplified by the cam extensions 30 relatively to the fulcrum pin 25, said block 26 being held in mesh with the teeth 28 of the shank 5 by the spring 19 and also due to the compression exerted upon the shank 5 and lever 29 by the hand.

It will be noted that a comparatively simple structure is provided in which the hand lever 29 acts as a lever of two classes, one in which the pin 25 serves as the fulcrum and the other in which the rear surface 33 of the carriage 7 acts as a fulcrum, which latter action releases the fulcrum block from the shank and allows the jaw carriage 7 to be moved to produce the large or main adjustment.

By constructing the intermediate jaw 9 as above described and as illustrated, no exterior parts are necessary to hold the jaw in frictional contact with the shank 5. Thus accidental falling or slipping of the intermediate jaw 9 is prevented automatically and the friction-producing means is not exposed.

Also by arranging the yoke 20, cavity 18, and spring 19 as illustrated and as above described, a strong and durable flexible connection is provided for holding the block 26, pin 25, and lever 29 to perform the functions above set forth.

Having thus described our invention what we claim as new and desire to secure by Letters Patent is:

1. A tool of the character described including a shank having a toothed rack and a jaw said shank having a free extended end forming a hand grip; a jaw carriage on the shank; a device having a portion adapted to intermesh with the teeth of said shank rack; a spring-controlled means for holding said portion of said device in mesh with any of the parts of the shank rack; and a lever having a bearing on said device and having a free sliding contact cam effective, when the lever is operated, to move said jaw carriage along said shank toward said first jaw for clamping purposes.

2. A tool of the character described including a shank having a toothed rack and a jaw; a jaw carriage on the shank; a device having a portion adapted to intermesh with the teeth of said shank rack; spring-controlled means for holding said portion of the device in mesh with any of the parts of the shank rack; and a lever having a bearing on said device and having a free sliding contact cam operative to move said jaw carriage along said shank toward said first jaw for clamping purposes, said lever having a portion adapted to fulcrum on said tool to move said portion of the device out of mesh with the teeth of the shank rack and allow said carriage to be slid along the shank.

3. A tool of the character described including a shank having a jaw; a jaw carriage movable on said shank; a fulcrum device; means for holding said fulcrum device against movement relatively to said shank; a lever having a bearing on said fulcrum device, said lever having a free sliding contact cam for moving said jaw carriage toward said first jaw for clamping purposes when the lever is moved on said device as a fulcrum, said lever having a portion adapted to form a second fulcrum with a part of the tool to cause said fulcrum device to be freed from said shank to allow the jaw carriage to be moved along said shank.

4. A tool of the character described including a shank having a jaw; a jaw carriage slidable on said shank, said shank having a toothed rack; a fulcrum device having teeth for engagement with the teeth of said rack; resilient means carried by said carriage and forming a support for said fulcrum device and to hold it with its teeth in mesh with said rack; and a lever movably connected to said fulcrum device, said lever having a cam for moving said jaw carriage toward said first jaw for clamping purposes, said lever having an extended portion operative to withdraw said fulcrum device out of mesh with said rack.

5. A tool of the character described including a shank having a toothed rack and a jaw; a jaw carriage slidable on said shank; a fulcrum device having teeth for engagement with the teeth of said rack; resilient means carried by said carriage and operative to hold the fulcrum device with its teeth in mesh with said rack; and a lever movably mounted on said fulcrum device and having a cam for direct sliding engagement with said carriage for moving it along said shank, said lever having an extended fulcruming portion adapted to effect the withdrawal of said fulcrum device out of mesh with said rack.

6. A tool of the character described including a shank having a jaw; a jaw carriage slidable on the shank, said shank having a toothed rack; a yoke embracing said jaw carriage; a fulcrum block having teeth adapted to mesh with the teeth of said rack and pivotally connected to the legs of said yoke; a spring for moving said yoke to hold said fulcrum block in mesh with the teeth of the rack; and a lever pivotally supported by said fulcrum block and having a cam for moving said jaw carriage and a second fulcruming part operative to effect the withdrawal of said fulcrum block out of engagement with the teeth of said rack to allow said jaw carriage to be freely slid on said shank.

7. A tool of the character described including a shank having a jaw; a jaw carriage slidable on the shank and having a cavity in its front part, said shank having a toothed rack at its rear; a yoke embracing said jaw carriage; a spring having a portion positioned within said cavity and another portion bearing on the closed end of the yoke; a fulcrum block supported by the yoke at the rear of said shank having teeth adapted to mesh with the teeth of said rack; a lever pivotally supported by said yoke and having a cam adapted to move said jaw carriage; and means for withdrawing said block out of mesh with the teeth of said rack.

8. A tool of the character described including a shank having a jaw; a jaw carriage slidable on the shank and having a cavity in its front part, said shank having a toothed rack at its rear; a yoke embracing said jaw carriage; a spring having a portion positioned within said cavity and another portion bearing on the closed end of the yoke; a fulcrum block supported by the yoke at the rear of said shank having teeth adapted to mesh with the teeth of said rack; and a lever pivotally supported by said yoke and having a cam adapted to move said jaw carriage, said lever having a fulcruming portion adapted to effect the withdrawal of said block out of mesh with said rack against the action of said spring.

9. A tool of the character described including a shank having a jaw; a jaw carriage slidable on the shank and having a cavity in its front part, said shank having a toothed rack at its rear; a yoke embracing said jaw carriage; a spring having a portion positioned within said cavity and another portion bearing on the closed end of the yoke; a fulcrum block supported by the yoke at the rear of said shank having teeth adapted to mesh with the teeth of said rack; and a lever pivotally supported by said yoke and having a cam adapted to move said jaw carriage, said lever having an extension adapted to fulcrum on said carriage to effect the withdrawal of said block out of mesh with the teeth of said rack against the action of said spring.

10. A tool of the character described including a shank having a jaw; a jaw carriage slidable on the shank, said shank having a toothed rack at its rear, said jaw carriage having a cavity slanting relatively to the length of the shank; a yoke embracing said jaw carriage in line with said cavity; a spring having a portion mounted within said cavity, said spring bearing against the closed end of said yoke; a toothed device carried by said yoke at the rear of said shank and adapted to mesh with the teeth of said rack; and a lever pivotally supported by said yoke and having a cam operative to move said jaw carriage, said lever having a fulcruming portion operative to effect withdrawal of the toothed device out of mesh with the rack against the action of said spring.

11. A tool of the character described including a shank having a jaw; a jaw carriage slidable on the shank, said shank having a toothed rack at its rear, said jaw carriage having a cavity slanting relatively to the length of the shank; a yoke embracing said jaw carriage in line with said cavity; a spring having a portion mounted within said cavity, said spring bearing against the closed end of said yoke; a toothed device carried by said yoke at the rear of said shank and adapted to mesh with the teeth of said rack; and a lever supported by said yoke and having a cam portion for engagement with a surface portion of said jaw carriage and an extension adapted to fulcrum against the rear of said jaw carriage.

12. A tool of the character described including a shank having a jaw; a jaw carriage slidable on said shank, said shank having a toothed rack; a device having teeth for engagement with the teeth of said rack; resiliently pressed means carried by said carriage; a lever; and a pivot connecting said device, resiliently pressed means, and lever, said resiliency pressed means serving to hold said device with its teeth in engagement with the teeth of the rack, said lever having a portion operative when swung on said pivot to move said jaw carriage toward said jaw, said lever having another portion operative to effect movement of said device to withdraw its teeth from the teeth of the rack against the action of said resiliently pressed means to allow said jaw carriage to be freely moved along said shank.

In testimony whereof we have signed our names to this specification.

EDWARD HOGE.
    FRIEDRICH KARL HOGE.